Feb. 6, 1973   C. L. LARSON   3,715,118
SHEET SEPARATOR AND FEEDER ASSEMBLY
Filed Dec. 3, 1970   5 Sheets-Sheet 5

CHARLES L. LARSON
INVENTOR
BY Kolisch & Hartwell
ATTY.

United States Patent Office 3,715,118
Patented Feb. 6, 1973

3,715,118
SHEET SEPARATOR AND FEEDER ASSEMBLY
Charles L. Larson, Grants Pass, Oreg., assignor to Jeddeloh Bros. Sweed Mills, Inc., Gold Hill, Oreg.
Filed Dec. 3, 1970, Ser. No. 94,643
Int. Cl. B65h 3/08, 3/46
U.S. Cl. 271—26 R   4 Claims

ABSTRACT OF THE DISCLOSURE

An automatic feeder assembly especially adapted for handling thin sheets, such as veneer, arranged in stacks. A vacuum-operated automatic feeder is provided for separating and lifting individual sheets from a stack and transferring the sheets to a desired location, such as the inlet of a loading mechanism for a multideck conveyor. The automatic feeder assembly includes a vacuum manifold provided with a telescoping head for each stack of sheets, adapted to engage the top surface of the uppermost sheet on the stack for lifting thereof. Means are provided for elevating and then plunging the head down with the upper sheet retained thereon, for separating the sheet from any lower sheets that are adhered thereto. The manifold and the sheet are then tilted to further ensure separation of the sheet from any lower sheets, and driven forward until the leading edge of the sheet is engaged by the inlet rollers of a loading mechanism. A plural array of telescoping heads can be arranged in side-by-side relationship to service multiple stacks of sheets.

BACKGROUND OF THE INVENTION

This invention relates generally to sheet-handling mechanisms. More particularly, the invention concerns an automatic feeder assembly especially adapted for separating and handling thin sheets, such as sheets of veneer, arranged in stacks.

Prior to the manufacture of products from veneer sheets, the sheets ordinarily are dried by placing the sheets on a multideck conveyor assembly which transports them through a dryer. Maximum utilization of the dryer requires that each deck of the conveyor assembly be fully loaded. Consequently, loading mechanisms have been designed for elevating sheets to the various levels of such multideck conveyors. One such apparatus is illustrated and described in U.S. Patent Reissue No. 24,843 to Otto G. Jeddeloh. The invention described therein contemplates a loading mechanism for a multideck conveyor assembly, which includes a relatively short loading conveyor mechanism mounted at one end for pivotal movement about a fixed axis. The outfeed end of the conveyor swings up and down into and out of registry with successive elevations of the multideck conveyor assembly of the dryer. The inlet end of the conveyor mechanisms remains fixed. Thus, the loadinng mechanism is used primarily to direct a sheet into an appropriate conveyor section, and to impart to the sheet sufficient momentum for the sheet to move onto a conveyor section.

The loadinng mechanism has been found to operate satisfactorily for the purpose designed. However, it requires loading of sheets therein by hand or by other peripheral means.

In designing a peripheral automatic feeder assembly for such a loading mechanism, it is necessary to overcome certain problems. For example, the sheets must be fed one at a time into the loading mechanisms and multideck conveyor. However, sheets of veneer, and particularly green veneer, located in a stack have a tendency to adhere together when lifted or handled. Futhermore, such thin sheets are easily damaged. When handling such sheets by hand it is possible for the handler to separate the sheets by bending or flipping the edges. However, in utilizing automatic lifting means such as a vacuum-operated lift plate, for example, it is difficult to ensure that only a single sheet will be lifted and advanced. Likewise, any force exerted against the edges of the sheets can result in damage thereto.

SUMMARY OF THE INVENTION

Accordings, it is an object of the invention to provide an automatic feeder assembly that is especially adapted for handling thin sheets, such as veneer sheets, arranged in stacks.

It is another object of the invention to provide a vacuum-operated automatic feeder assembly which includes movable means for separating and handling sheets.

It is a further object to provide in an automatic feeder assembly, which utilizes a vacuum manifold provided with a telescoping head adapted to engage the uppermost sheet on a stack, including means for elevating and then plunging the head down for separating the sheet being handled.

It is yet another object of the invention to provide, in such an automatic feeder assembly, means for tilting the vacuum manifold and driving the vacuum manifold forward with a sheet gripped thereby until the leading edge of the sheet is engaged by another mechanisms, such as the inlet rollers of a loading mechanism.

These and other objects of the invention are attained in an automatic feeder assembly that can include a vacuum-operated manifold with a chamber and telescoping head for each set of infeed rollers of a loading mechanism employed in conjunction therewith. Each manifold chamber is arranged generally above a stack of sheets to be handled and a lifting head that is adapted to telescope within the manifold chamber. The lifting head includes a pad adapted to sealingly engage the upper surface of the top sheet of the stack for vacuum lifting thereof. With the lifting head moved into engagement with the top sheet, the lifting head is drawn upwardly by vacuum pressure to a first level. Hydraulic means are provided to move subsequently the lifting head with the sheet gripped therein, upwardly to a second level and then to abruptly plunge the lifting head back to the first level. The lifting head and manifold are then tilted to elevate the leading edge of the sheet. These motions serve to agitate the uppermost sheet and separate any of the lower sheets of the stack that are adhered to the uppermost sheet.

The lifting head and manifold are then advanced along a carriage until the leading edge of the sheet is received in the infeed rollers of the conveyor-loading mechanism. The vacuum pressure of the lifting head is cut-off so that the sheet is released, and the lifting head is returned to its original position for handling the next sheet on the stack.

The automatic feeder is adapted to be retracted to a raised position away from the stack to permit hand feeding of the loading mechanism. The automatic feeder can include a plurality of manifold chambers, arranged in side-by-side relationship, to service a number of stacks of sheets at the same time.

BRIEF DESCRIPTION OF THE DRAWINGS

Other objects and advantages of the invention will become apparent from the following detailed description of the invention taken in conjunction with the accompanying drawings, wherein:

FIG. 6 (sheet 2) is a fragmentary view in partial section, taken along lines 6—6 in FIG. 4.

DETAILED DESCRIPTION OF THE INVENTION

Figure 1:
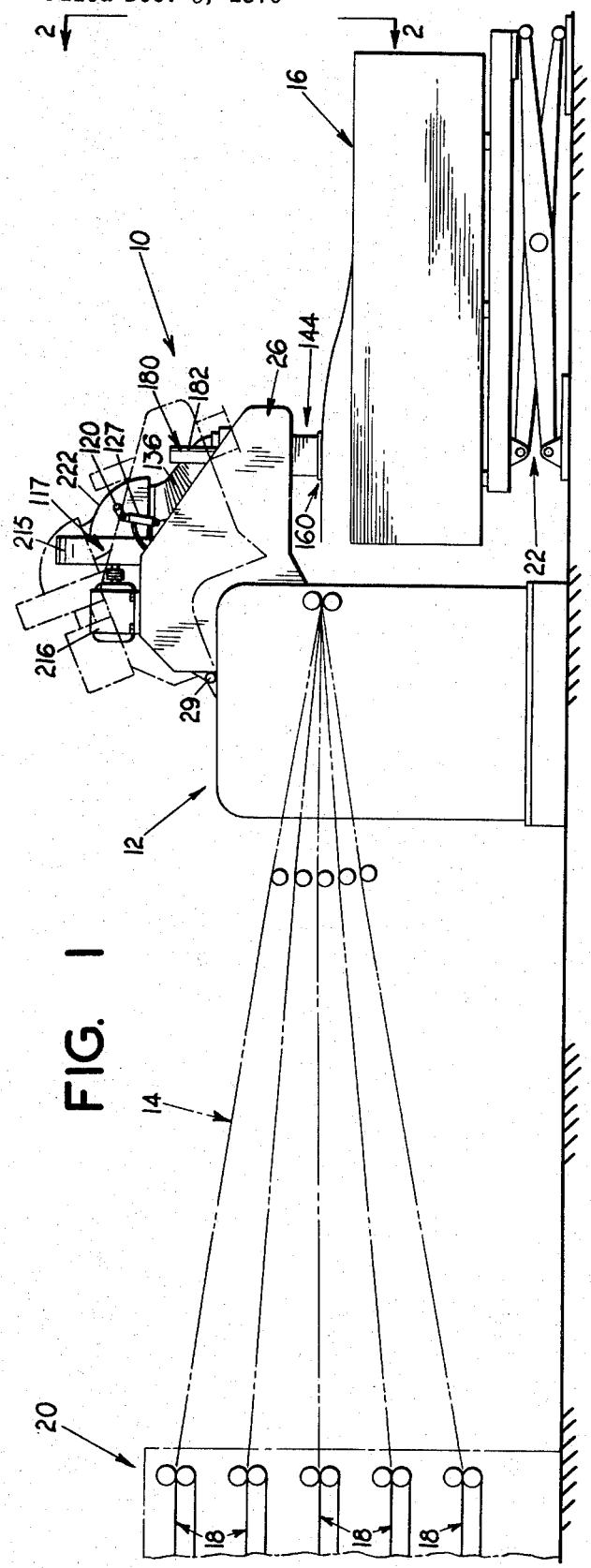
FIG. 1 is a diagrammatic side elevation view of a sheet feeder assembly designed in accordance with the invention, arranged in conjunction with a sheet loading mechanism and a multideck conveyor assembly of a veneer dryer.
Figure 2:
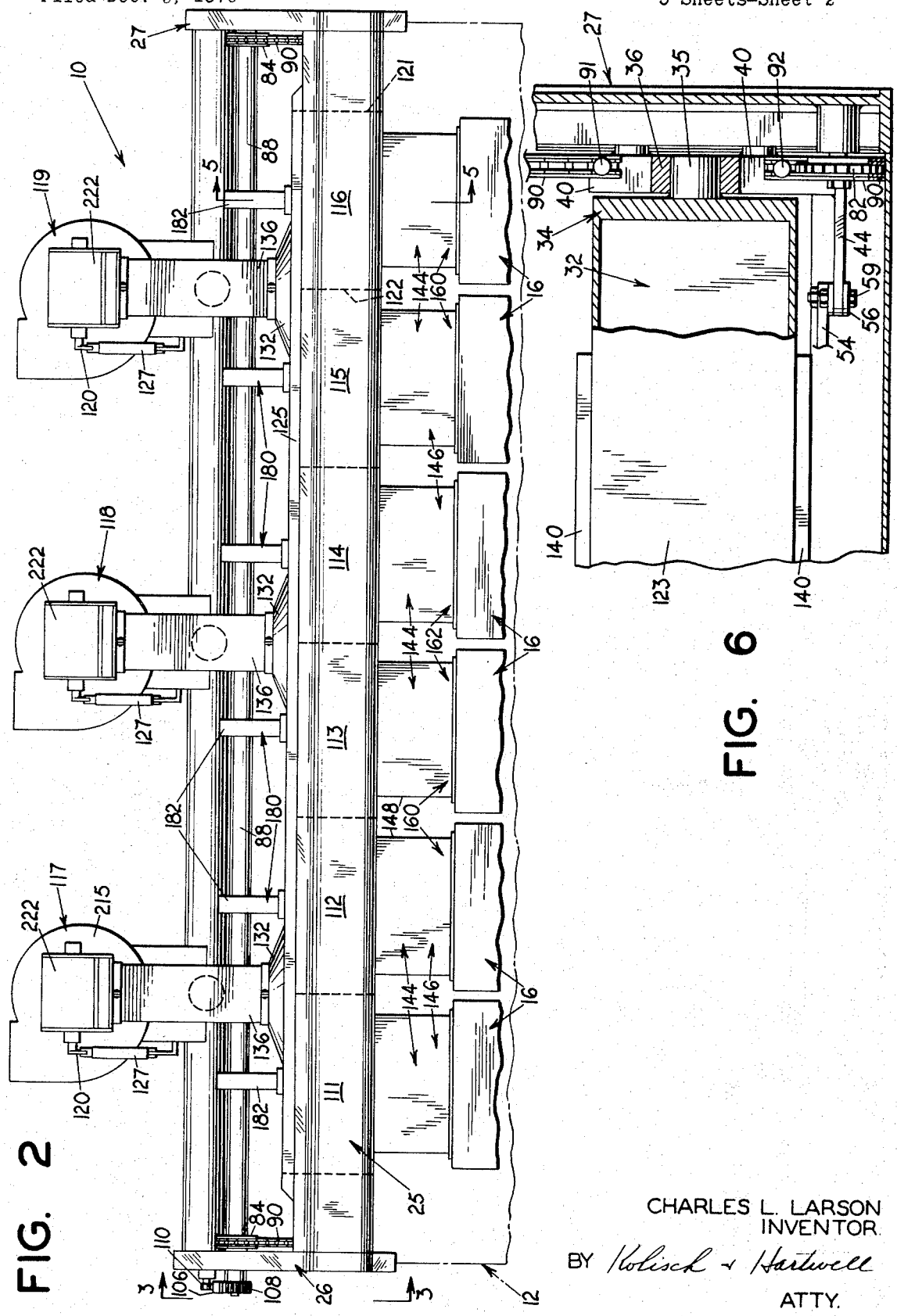
FIG. 2 is a diagramamtic end elevation view of the sheet feeder assembly taken along lines 2—2 in FIG. 1.

Referring now to the drawings and particularly to FIGS. 1 and 2, one preferred embodiment of the invention is illustrated in the form of an automatic feeder assembly generally indicated at 10. Feeder assembly 10 is arranged for operation in conjunction with a sheet-loading mechanism 12 and a multideck conveyer 14 adapted for the transfer, selectively, of individual sheets from stacks, such as stack 16, to the decks 18 of a multilevel dryer 20. As best illustrated in FIG. 2, the sheet separator assembly can be adapted to service a dryer having a width that will accommodate up to six or more panels laid side-by-side. In the arrangement shown, six feeder assemblies and sheet-loading conveyers are arranged in corresponding side-by-side relationship to service the multiple stacks of sheets. The feeder assemblies are arranged generally in pairs, with each pair being adapted to receive vacuum pressure from a single blower in a manner explained in detail hereinafter. It should be noted that other arrangements of the feeder assembly are possible without departing from the invention.

Multilevel dryer 20 is of conventional design including a plurality of decks 18 especially designed for continuously drying sheets of veneer. The dryer is loaded by means of multideck conveyer 14 and a loading mechanism 12 also of conventional design loading mechanism 12 might comprise apparatus as described in U.S. Reissue Pat. No. 24,843 for example.

Each stack 16 comprises a number of thin sheets, such as veneer sheets piled one on top of another. The sheets are usually of nonuniform length and width, and may vary considerably in dimension. The sheets are arranged in each stack upon a conventional scissor lift 22, that is adapted to be raised progressively as sheets are removed from the top of the stack for maintaining the uppermost sheet on the stack at approximately the same level.

Feeder assembly 10 generally comprises a hood 25, having a supporting framework 26, 27 secured at each end. The hood and supporting frameworks are pivotally attached to loading mechanism 12, such as by brackets 29 secured between the top of the loading mechanism and the supporting frameworks. Hydraulic rams 30 are provided at each end of the feeder assembly being secured between the loading mechanism and the supporting framework for selectively raising the feeder assembly about the pivot point established by brackets 29. This allows the feeder assembly to be raised to an elevated position, permitting sheets to be hand fed into the loading mechanism, if desired. When placed in its lower position, the feeder assembly is positioned for engaging and lifting, selectively, individual sheets from the top of each of the stacks and moving the sheets forward until a leading edge thereof is engaged by inlet rollers, not shown, of loading mechanism 12, in a manner explained in more detail hereinafter.

A vacuum manifold 32 is suspended generally within hood 25, extending the full length of the hood and being pivotally secured at its ends to supporting frameworks 26, 27 by trunnions 34 best illustrated in FIG. 6. Trunnions 34 include a pin 35 secured to the end plate of the manifold, and a bearing 36 adapted to pivotally support the pin. Bearing 36 forms part of a carriage 40 supported on, and adapted for horizontal movement with respect to supporting framework 27, in a manner explained in detail hereinafter.

Figure 4:
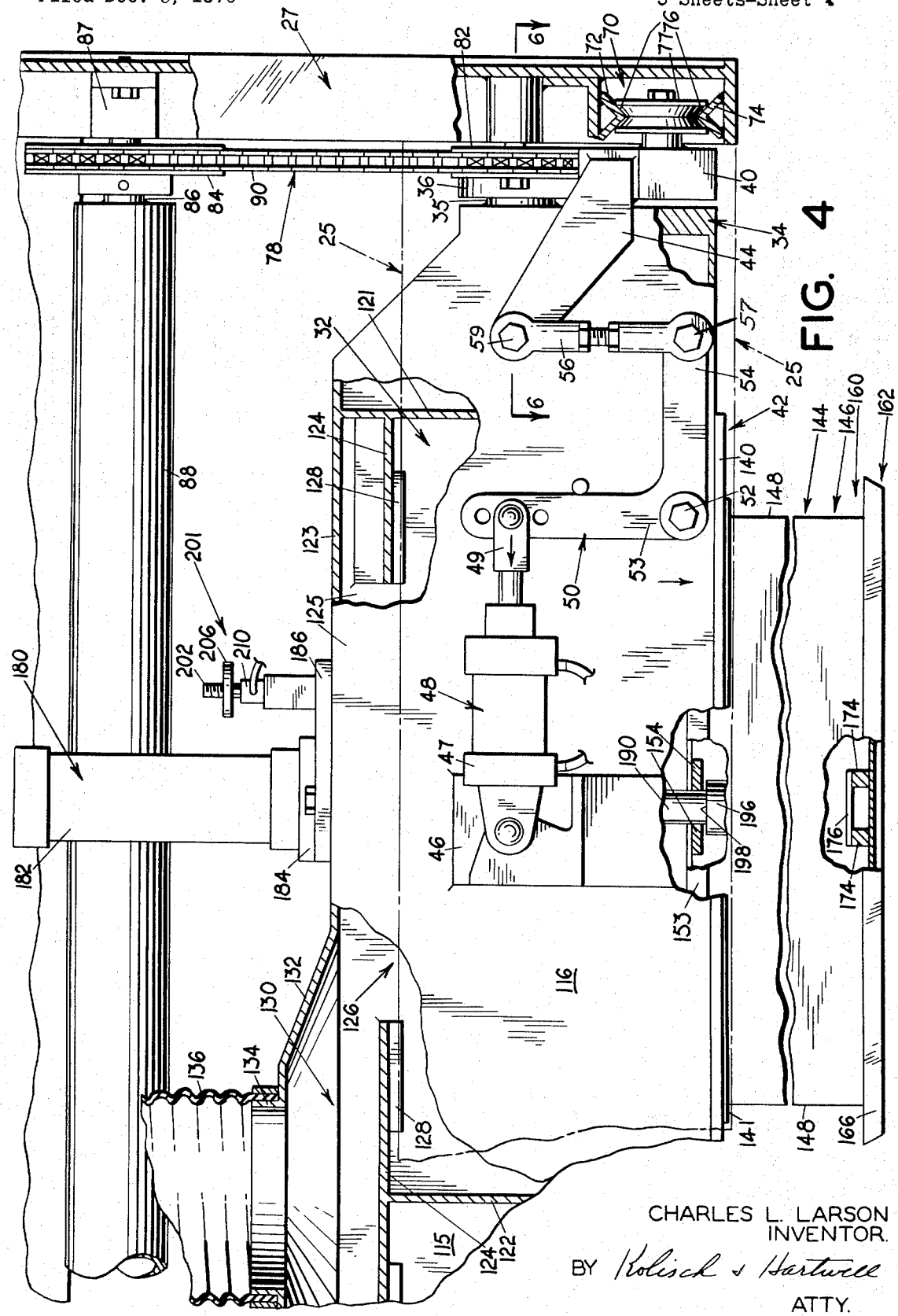
FIG. 4 is a fragmentary view, in section, taken along lines 4—4 in FIG. 2.

Tilting mechanisms 42, such as that illustrated in FIG. 4, are provided at each end of the manifold. The tilting mechanism includes a linkage that extends generally between a bracket 44 secured to carriage 40 and a bracket 46 secured to the side of the manifold, within hood 25. The linkage includes hydraulic ram 48 having its cylinder end 47 pivotally secured to bracket 46 and its shaft end 49 pivotally secured to an end 51 of arm 50. Arm 50 is an L-shaped bracket, with the elbow 53 of the bracket being pivotally anchored to the manifold by a connection 52. The other end 54 of arm 50 is pivotally secured to one end of a pin 56 by a connection 57. The other end of pin 56 is pivotally secured to bracket 44 by a connection 59. The connections at either end of ram 48 are conventional clevice and pin arrangements and connections 52, 57 and 59 are all universal type connections, such as conventioinal ball bushings.

Ram 48 is illustrated in its fully extended position. Accordingly, upon retraction of the shaft within the cylinder, arm 50 is pivoted in a counterclockwise direction, as illustrated in FIG. 4, whereby pin 56 is placed under compressive force. Since pin 56 is connected through bracket 44 to carriage 40, the pivot point established at elbow 53 of arm 50 is forced downwardly with respect to the carriage. This causes the lower front edge of the manifold, to which elbow 53 is attached, to move downwardly and tilt the manifold in the order of 5 to 10 degrees to the angular position illustrated in dotted outline in FIG. 5. Upon extension of the shaft of ram 48, the manifold is returned to its normal, vertical position. The purpose for tilting the manifold is explained in more detail hereinafter.

Figure 3:
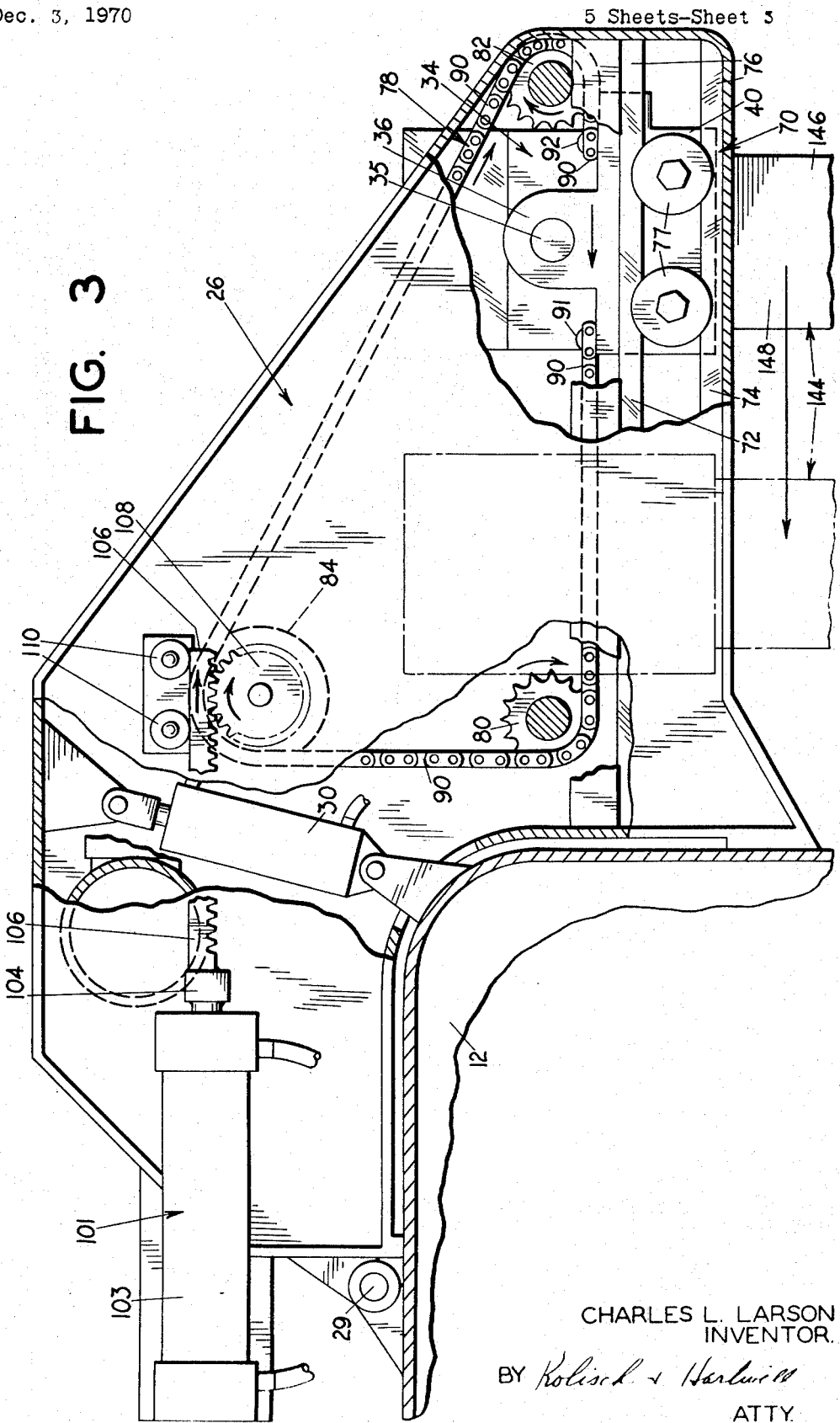
FIG. 3 is an enlarged right elevation view in partial section of the sheet feeder assembly taken along lines 3—3 in FIG. 2.

In addition to tilting movement, the manifold is adapted to be moved laterally with respect to the loading mechanism along a track best illustrated in FIGS. 3 and 4. Referring particularly to FIG. 4, track 70 is illustrated in cross section as comprising upper track member 72 and lower track member 74. Both track members are comprised of angle members, with upper track member 72 having its angle oriented in a downward facing direction and lower track member 74 having its angle inverted with respect thereto so that the flanges 76 of wheels 77 engage and are retained between the edges of the angle members. Both track members are secured by suitable means, such as by welding, to supports extending from framework 27.

Wheels 77 are journaled on the side of carriage 40 near the bottom thereof and serve to support the weight of the carriage and manifold. In the embodiment illustrated, two wheels are provided on each of the manifold. However, it should be understood that a greater number of wheels or another type of suspension could be utilized without departing from the scope of the invention.

Figure 5:
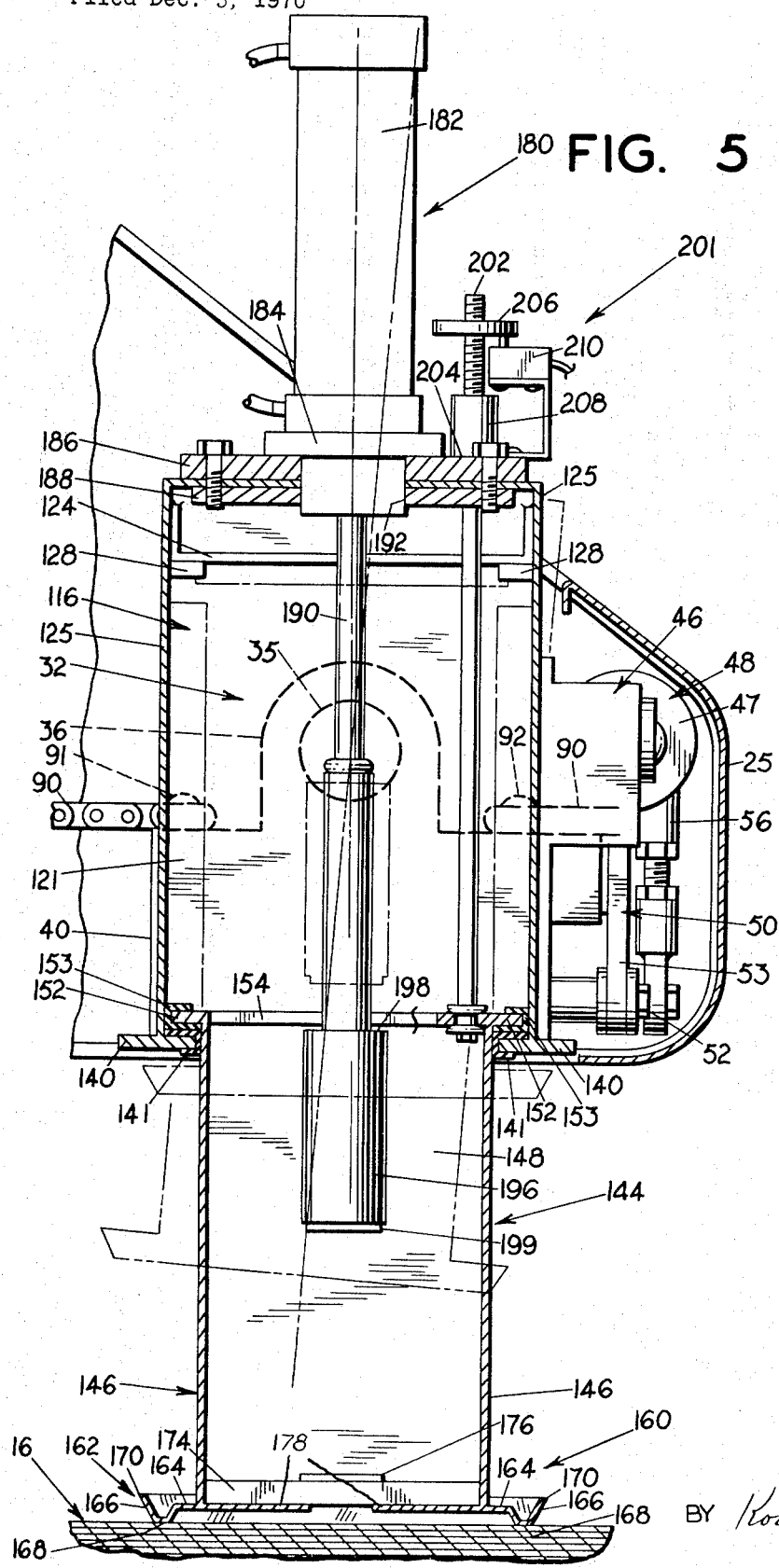
FIG. 5 is a fragmentary view in partial section taken along lines 5—5 in FIG. 2.

Referring now to FIG. 3, the track is illustrated as extending from the front to the rear of the framework whereby the carriage is adapted for lateral movement between the position shown in solid outline and the position shown in dotted outline in FIG. 5.

Means are provided at the ends of the manifold for moving the carriages and the manifold between the positions illustrated. The drive means associated with one framework will be described in detail, it being understood that the other drive means is of substantially the same design. Referring now to FIGS. 3 and 4, drive means 78 includes a sprocket 82 journaled on framework 27 near the front of the feeder assembly and a sprocket 80 journaled on framework 27 toward the rear of the framework and at the same elevation as sprocket 80. Above sprocket 80, a sprocket 84 is suspended, being fixed to a shaft 86 that is rotatably supported on framework 27 by a bearing 87. Shaft 86 forms an end extension of a torque tube 88 that extends the full length of the feeder assembly. A chain 90 is secured at one end of carriage 40 by a connector 91 and is trained about sprockets 80, 84 and 82, respectively. Chain 90 has its other end connected to the other side of carriage 40 by a connector 92. Accordingly, power rotation of the torque tube and sprocket 84 in a clockwise direction as viewed in FIG. 3 serves to drive the carriage and manifold along track 70 toward loading mechanism 12. Power rotation of sprocket 84 and the torque tube in the opposite direction serves to drive carriage 40 and the manifold along track 70 away from loading mechanism 12, for a purpose explained in detail hereinafter.

Referring again to FIG. 3, a ram or motor 101 is provided on framework 26 for selectively rotating torque tube 88. The ram includes a cylinder 103 secured to the framework and an extensible shaft 104 having a rack 106 secured at the outer end thereof. Rack 106 is adapted to be moved laterally upon the extension of shaft 104 between a pinion 108 secured on the torque tube and backing rollers 110 secured on the outer side of framework 26. The rack engages the teeth on the pinion and rotates the torque tube. The movement of motor 101 is selectively controlled, by means not shown, to effect rotation of the torque tube and movement of the framework and manifold at desired times in the operation of the feeder assembly.

Referring again to FIGS. 2, 4 and 5, each manifold is generally subdivided into a plurality of chambers, such as chambers 111–116. The chambers are arranged in pairs with each pair of chambers being adapted for evacuation by one of vacuum pressure sources 117, 118, 119, respectively.

Each manifold chamber is bounded by the top 123 and sides 125 of the manifold, by an end wall 121 entirely closing one end of the chamber and an end wall 122 partially closing the other end of the chamber. A plate 124 is horizontally arranged below the top of the manifold, having a generally rectangular opening 126 formed therein. A resilient pad 128 is provided about the periphery of opening 126 on the lower side of plate 124. An opening 130 is formed in the top of the manifold between adjacent pairs of chambers. A pressure tight hood 132 having a raised circular wall 134 formed in the top thereof is secured to the top of the manifold around opening 130. Wall 134 is adapted to be connected to one of the vacuum pressure sources through a flexible hose 136. Hood 132 and plates 124 of the adjacent manifold chambers define a pressure infeed channel that equally divides the vacuum pressure between the paired chambers. Each of the plates 124 further serves as a baffle for concentrating the vacuum pressure in the center of the respective chambers. The bottom of each manifold chamber is substantially open, with a plate 140 being secured to the bottoms of walls 121, 122 and sides 125 of the manifold, respectively. Plate 140 forms a lip around the periphery of the manifold chamber, and serves to engage and support the upper structure of feeder head 144 (also sometimes referred to herein as a vacuum or lifting head) when the feeder head is in the lower position illustrated in solid outline in FIG. 5.

Each feeder head 144 generally comprises opposed sides 146 and opposed ends 148. The top and bottom of the feeder head are generally open to permit passage of air therethrough. An outwardly extending lip 152 is formed about the outer periphery of the top of the feeder head, such as by horizontally disposed plates welded thereto. One or more bars 154 are provided at the top of the feeder head extending between sides 148 and being secured at their ends to plates 152.

The feeder head includes a foot 160 adapted to engage the upper surface of the top sheet on a stack without damaging the surface thereof. The foot includes a lip 162 extending outwardly from the bottom of the periphery of the feeder head. The lip 162 is comprised of a horizontally extending plate 164 terminating in a rim 166. Rim 166 includes a narrow padded face 168 adapted to engage the surface of a sheet without damaging it. Rim 166 further includes an upwardly flared outer portion 170 whereby the rim does not gouge the surface of the sheet upon lateral movement of the feeder head with respect to the sheet. The foot of the feeder head further includes one or more support bars 174 extending between sides 148 and having their ends secured thereto such as by welding. The support bars serve as a bar for a pad 176 secured thereto and located centrally of the cross section of the feeder head. Flow restrictor plates 178 are provided beneath the support bars. The restrictor plates partially constrict the cross section of the feeder head whereby the flow of air through the feeder head, with the foot structure uncovered, is substantially reduced. This minimizes air losses. However, when the opening defined by rim 166 is covered, such as by sheet material, the restrictor plates are ineffectual and lifting force of the feeder head is proportional to the full size of the opening defined by the periphery of rim 166.

Each feeder head is adapted to telescope within its corresponding manifold chamber, with its range of movement being defined between the lowermost position illustrated in solid outline in FIG. 5 and an uppermost position wherein the feeder head is withdrawn within the manifold chamber to the position illustrated in dotted outline with the top of the feeder head in contact with the pad 128 on baffle plate 124. To minimize air losses around the side of the feeder head during such telescopic movement, the inner edge of lip 140 is padded with a resilient elastomeric layer 141 adapted to engage the sides 148 and ends 146 of the feeder head. A similar elastomeric layer 153 is provided on plate 152 for sealing purposes.

A hydraulic arm 180 is provided in each manifold chamber, being secured with its cylinder portion generally extending above the top of the manifold and an extensible shaft portion extending into the interior of the manifold chamber. Referring particularly to FIG. 5, ram 180 includes cylinder portion 182 having a flange 184 formed about the periphery of the lower end thereof. Flange 184 is secured by suitable means such as by cap screws or welding to a support plate 186 resting upon top 123 of the manifold. A backing plate 188 is provided on the interior side of the manifold chamber. Ram 180 includes an extensible shaft 190 adapted to extend through a suitable opening 192 through the manifold head and plates 186, 188. Shaft 190 is provided with a piston or plunger 196 at its lower end having an upper shoulder 198 of substantially larger diameter than the diameter of shaft 190 and having a lower head 199, also of enlarged diameter. Shaft 190 is mounted generally in the center of the cross section of the feeder head with its shaft extending between spaced-apart cross members 154 whereby the upper shoulders 198 of piston 196 will engage cross members 154 and lift the head upon retraction of the shaft within cylinder 182. Upon extension of the shaft, lower head 199 of piston 196 is properly aligned to contact pad 176 at the foot of the feeder head and plunge the feeder head downwardly, for a purpose explained hereinafter.

Each feeder head otherwise includes a limit switch control 201 including a shaft 202 secured to the top of the feeder head and extending upwardly through an opening 204 in the top of the manifold. A control stop 206 is provided on the top of shaft 202, having a threaded inner bore adapted to engage a corresponding threaded portion on the top of shaft 202. Accordingly, the control stop can be vertically adjusted with respect to the shaft. A bushing 208 is provided about shaft 202 at the top of the manifold head to prevent excessive loss of air around the shaft. A switch control arm 210 is provided in line with the control means whereby vertical movement of the shaft will cause control stop 206 to engage switch control arm 210 and operate a switch, not shown, associated therewith. Thus, as the feeder head is lowered into contact with the top of the stack, shaft 202 moves downwardly until control arm 210 and the corresponding switch are actuated. The switch controls suitable means for operating the scissor lift upwardly to maintain the top of the stack at the proper level for operation of the feeder head.

Referring particularly to FIGS. 1 and 2, one of the vacuum supply sources is described in detail, it being understood that the other vacuum sources are of similar construction. Vacuum supply 117 comprises a blower 215 of conventional design driven by a motor 216 secured to the top of the feeder hood. Blower 215 communicates with the paired vacuum infeed chambers 132 via a flexible hose 136 of rubber or other resilient material. A valve 222 is provided in the hose for controlling the flow of air therethrough. A louver 120 of the valve is adapted for movement between open and closed positions under the control of a hydraulic ram 127. Hydraulic ram 127 is controlled by suitable means, not shown, to selectively cut off air flow to the manifold to release panels lifted by the feeder heads.

In the operation of the automatic feeder assembly, the assembly is lowered by means of hydraulic rams 30 into an operative position over the veneer stacks 16. The scissors lifts are operated so that the tops of the respective stacks are arranged near the operating level to the feeder assembly. The carriage 40 of the feeder assembly is automatically positioned near the front of the hood away from the loading mechanism. The vacuum pressure supply fans are energized and the louvers of valves 222 are closed so that vacuum pressure is not available within the manifold chambers. Accordingly, the foot of each feeder head drops into contact with the top surface of the uppermost sheet of its respective stack. At this time, the foot of the feeder head is approximately centered with respect to the elongate axis of the respective sheet and is set back several feet from the leading edge of the sheet.

With the rim of the foot in light contact with the surface of the uppermost sheet, vacuum pressure is supplied to the manifold chamber and causes the uppermost sheet to be gripped firmly against the rim. As the sheet is gripped tightly against the rim, air loss is reduced and the feeder head is drawn upwardly within the manifold chamber until a position of equilibrium is reached which is determined by the level of vacuum pressure and the weight of the sheet or sheets being lifted. The vacuum pressure level is preferably adjusted so that the sheet is lifted approximately six inches during this first cycle of operation. It should be noted that only the leading edge of the sheet is lifted, with the sheet having sufficient flexibility so that the trailing edge of the sheet remains on the stack. Furthermore, it should be noted that, due to the tendency of wet veneer sheets to cling together, two or more sheets may adhere to and be lifted with the uppermost sheet.

With one or more sheets gripped against the foot of the partially raised feeder head, cylinder 180 is actuated whereby shaft 190 is retracted within cylinder 182 and piston 196 is drawn upwardly. Piston 196 is raised until the shoulders 198 on the piston engage cross member 154 at the top of the feeder head, further raising the feeder head to a second position with the top of the feeder head in contact with pad 128 on baffle plate 124. In the latter position, the trailing edge of the sheet is still rested upon the top of the stack.

With the feeder head in the uppermost position, hydraulic ram 180 is actuated in the opposite direction whereby shaft 190 is rapidly extended from cylinder 182. Consequently, the bottom of piston 196 strikes pad 176 at the bottom of the feeder head. Piston 196 plunges the feeder head downwardly with a sudden motion which tends to trap air beneath the sheet and the stack. Furthermore, due to the flexibility of the sheets, the center portion of the sheet is momentarily elevated above either end and a snap action is applied to the sheet. Such action or agitation causes any sheets adhered to the uppermost sheet to be separated therefrom and to drop back onto the stack.

At this time, hydraulic rams 48 located at either end of the carriage are actuated to tilt the manifold and elevate the leading edge of the sheet with respect to the feed line. This tends to bend the leading edge of the sheet upwardly and further acts to separate any sheets still adhering to the uppermost sheet that were not heretofore separated.

With the manifold and all the feeder heads properly tilted, hydraulic ram 101 is actuated and rotates torque tube 88 to advance the carriage toward the loading mechanism. During the transition of the carriage along tracks 78 between its initial position and its final position, the manifold is tilted back to a vertical position whereby the leading edge of each of the sheets is aligned along the infeed line of the loading mechanism. When the carriage reaches its forward position, the leading edge of each sheet is fed between the infeed rollers, not shown, positioned on either side of the feed line whereby the sheet is gripped and drawn into the loading mechanism. At approximately that time, vacuum pressure in the manifold chambers is terminated whereby contact is broken between the sheet and the feeder head. At the same time, the torque tube is stopped with the carriage in the forward position. The infeed rollers subsequently draw the sheet into the loading mechanism with the trailing edge of the sheet being dragged along the top of the stack and eventually drawn into the loading mechanism.

With the sheet separated from the feeder heads, the torque tube is rotated in a reverse direction by hydraulic ram 101 to withdraw carriage 40 toward the front of the feeder assembly whereby it is suitably positioned over the stack for the next cycle of operation. Once the feeder head is separated from the sheet, vacuum pressure within the manifold chamber is reduced and the feeder head begins to drop from the bottom of the manifold chamber until it comes into contact with the upper surface of the next sheet on the stack and the cycle of operation is repeated.

The operation of the feeder apparatus described hereinbefore has a number of advantages. In particular, the apparatus operates to automatically handle individual sheets where such sheets were previously handled by hand. This enables the high speed handling of a greater number of sheets with a significant savings in labor costs. Furthermore, the apparatus serves to lift and separate the sheets from a top of a stack without damaging such sheets. Thus, while the apparatus has been described in operation with a loading mechanism and drying conveyor, it has application in other and varied application wherever handling of stacked sheets is required.

It is claimed and desired to secure by Letters Patent:

1. A feeder assembly for selectively transferring sheets from a sheet station to a receiving location comprising
   a hollow manifold having a vacuum chamber defined within its disposed above said sheet station,
   a hollow vacuum head having an interior communicating with said vacuum chamber extensibly mounted within said manifold for movement downwardly from the base of the manifold to a lowered position relative to the manifold, said vacuum head having an opening defined at the base thereof communicating with the interior of the head by which suction is applied to a sheet, the combined volume of said vacuum chamber and the interior of said head decreasing with retraction of the head upwardly within said manifold from its said lowered position,
   means for applying vacuum to said manifold and said vacuum head which vacuum results in retraction of said lifting head within said manifold on said opening being closed off by a sheet, and
   a power-operated reciprocal plunger interposed between said manifold and said vacuum head which, with the vacuum head retracted upwardly from its lowered position is actuatable in a plunging stroke to strike said head thus to plunge the head downwardly to a position short of its fully lowered position.

2. The feeder assembly of claim 1, wherein said power-operated plunger comprises a plunger disposed within said vacuum head, and a fluid-power-operated ram connected to the plunger and actuatable to reciprocate said plunger, said vacuum head including a pad which is struck by said plunger on downward movement of the plunger.

3. A feeder assembly for selectively transferring sheets from a stack to a receiving location comprising
- a frame including portions spaced on each side of said stack,
- a pair of carriages movably mounted, one on each of said frame portions for lateral movement with respect to said stack,
- a hollow manifold having a vacuum chamber defined within it disposed between said frame portions,
- pivot means pivotally mounting the manifold to the carriages for supporting said manifold,
- a hollow vacuum head having an interior communicating with the vacuum chamber extensibly mounted within said manifold for movement downwardly from the base of the manifold to a lowered position relative to the manifold, said vacuum head having an opening defined at the base thereof communicating with the interior of the head by which a suction force is applied to a sheet, the combined volume of said vacuum chamber and the interior of said head decreasing with retraction of the head within said manifold from its said lowered position,
- means for applying a vacuum to said manifold and said vacuum head which vacuum results in retraction of said vacuum head upwardly within said manifold on said opening being closed off by a sheet,
- a power-operated reciprocal plunger extending between the manifold and vacuum head which, with the vacuum head positioned upwardly from its lowered position, is selectively operable to elevate and then plunge downwardly said head,
- means secured between said frame and said manifold for selectively tilting said manifold with respect to said frame, and
- means on said frame for selectively moving said carriages on said portions of said frames.

4. An automatic feeder assembly for selectively transferring sheets from a stack to a receiving location comprising
- a frame including opposed ends spaced one on each side of said stack and a hood connecting said ends,
- a pair of carriages movably secured, one on each of said ends, for lateral movement with respect to said stack,
- a manifold including a vacuum chamber spaced between said frame ends,
- a pair of trunnions, one securing each of said carriages to said manifold for supporting said manifold,
- a vacuum head extensibly mounted within said chamber, said head being provided with a sheet-engaging lip at a bottom end thereof,
- hydraulic means extending between said manifold and said vacuum head for selectively elevating and then plunging downwardly said head,
- means secured between said frame and said manifold for selectively tilting said manifold with respect to said frame, and
- means on said frame for selectively moving said carriages with respect to said stack.

References Cited

UNITED STATES PATENTS

| | | | |
|---|---|---|---|
| 1,546,184 | 7/1925 | Aldrich | 271—26 R |
| 2,097,587 | 11/1937 | Dearing | 271—26 R |
| 3,391,924 | 7/1968 | Schmidlin et al. | 271—9 |
| 2,976,037 | 3/1961 | Seel et al. | 271—26 R |
| 1,457,775 | 6/1923 | Henderson | 271—26 R |
| 3,430,949 | 3/1969 | Herdeg et al. | 271—26 R X |

EVON C. BLUNK, Primary Examiner

B. H. STONER, Jr., Assistant Examiner

U.S. Cl. X.R.

214—8.5 D; 271—11